Patented Aug. 28, 1923.

1,466,061

UNITED STATES PATENT OFFICE.

OSCAR REBELLO, OF BAHIA, BRAZIL.

HOMOGENEOUS ALUMINUM SOLDER.

No Drawing.    Application filed March 14, 1923. Serial No. 624,929.

*To all whom it may concern:*

Be it known that I, OSCAR REBELLO, a citizen of the Republic of Brazil, and resident of the city of Bahia, Brazil, have invented certain new and useful Improvements in Homogeneous Aluminum Solder, of which the following is a specification.

My invention consists of an improvement in solders for uniting aluminum and provides a simple inexpensive and satisfactory method of soldering aluminum articles to one another so that pieces of aluminum soldered by the process exhibit great resistance both to bending and drawing and may be hammered and worked without rupture of the joint. Attempts have heretofore been made to provide a solder for joining aluminum parts but the results have not been satisfactory because in the use of such prior aluminum solders it has been necessary to soak in a suitable pickle, or paint said parts with a suitable acid preparation preparatory to applying the solder which is a laborious and costly method.

The solder for use in this invention may be prepared as follows:

There are melted together in a crucible of suitable capacity, silver, copper, and aluminum of approximately by weight one-third each. When fusion is completed the attained molten mass is cast into the form of sticks or bars of suitable sizes in respect of cross sections and length. The proportions indicated of the specific materials may be modified slightly accordingly as it is desired to obtain a more or less soft solder.

In using my invention the aluminum parts which are to be soldered or brazed together are first cleaned with a file or other suitable means, a sufficient amount of the solder laid on the requisite portion of one of the aluminum parts to be joined, said portion and solder and the requisite portion of the other part to be joined being then heated by means of a blow-pipe or the like and when the solder has been sufficiently melted thereby the requisite portions of the parts to be joined are pressed together by means of a vise, pincers or the like. The work is now allowed to cool. Soldering performed in this manner allows of any subsequent manipulation without fear of rupture, as the solder and the soldered parts become homogeneous.

It will be understood that while I have described a preferred method of practicing my invention the same may be varied within the scope thereof and the proportions of the materials specified likewise varied slightly.

Having thus described my invention what I claim is:

A solder for aluminum composed of silver ranging from 53 to 63 parts, copper ranging from 57 to 64 parts and aluminum ranging from 64 to 73 parts.

In testimony whereof I have hereunto affixed my signature.

OSCAR REBELLO.